Nov. 19, 1935.  O. B. HARMON  2,021,780
LOAD BEARING BRACKET AND METHOD OF SECURING SAME
Filed March 2, 1931  2 Sheets-Sheet 1
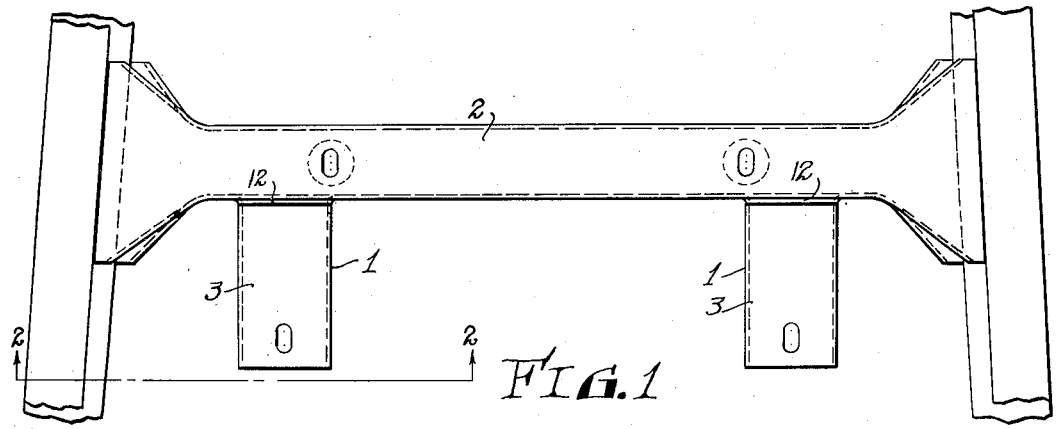
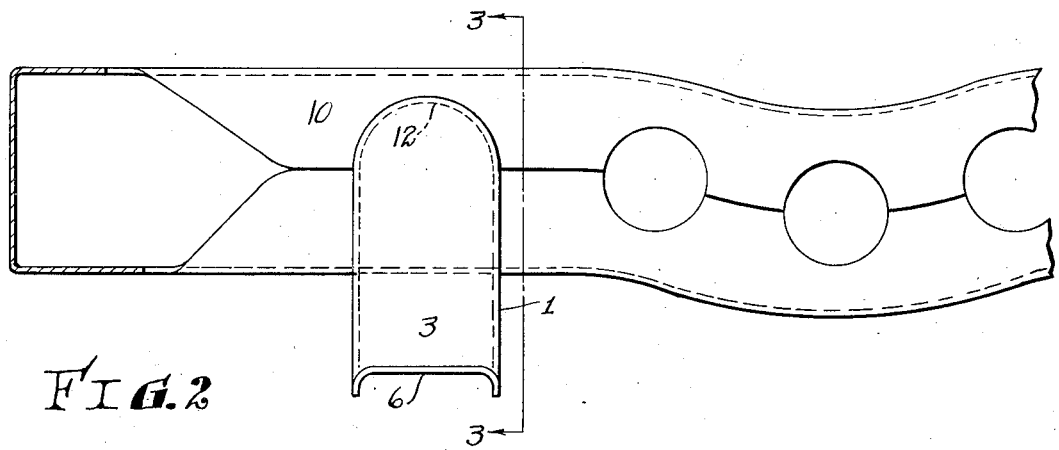
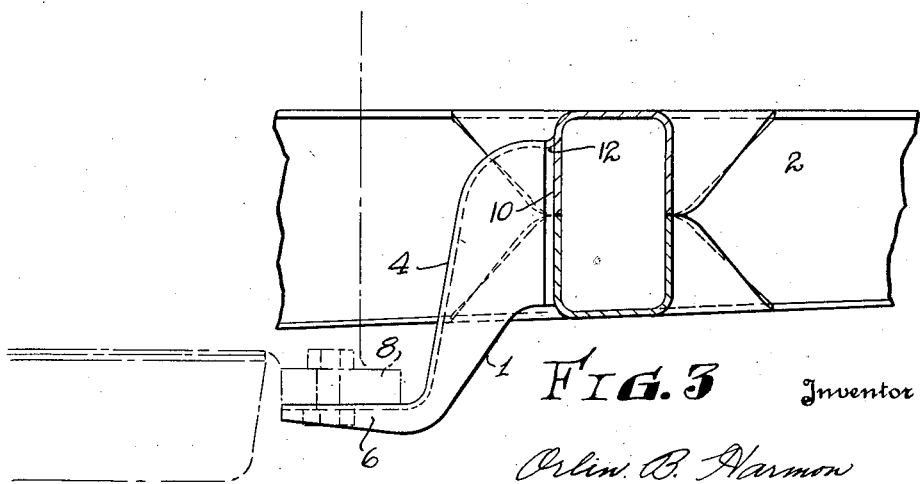
Inventor
Orlin B. Harmon
By Macklin, Soule & Leonard
Attorneys Nov. 19, 1935.    O. B. HARMON    2,021,780
LOAD BEARING BRACKET AND METHOD OF SECURING SAME
Filed March 2, 1931    2 Sheets-Sheet 2

Inventor
Orlin B. Harmon
By Macklin, Soule & Leonard
Attorneys

Patented Nov. 19, 1935

2,021,780

UNITED STATES PATENT OFFICE 2,021,780

LOAD BEARING BRACKET AND METHOD OF SECURING SAME

Orlin B. Harmon, Lakewood, Ohio, assignor to The Midland Steel Products Company, Cleveland, Ohio, a corporation of Ohio Application March 2, 1931, Serial No. 519,449

2 Claims. (Cl. 280—106)

This invention relates to vehicle frames and particularly to a supporting bracket and other frame elements and the manner of fastening the same together.

A feature of my invention is a bracket made of sheet metal which economically utilizes stock material.

Another important feature of my invention resides in the manner in which the bracket or one or more members of the frame are joined together.

The accompanying drawings illustrate some preferred embodiments of my invention.

In the drawings, Fig. 1 is a plan view of a cross frame member with engine supporting brackets secured thereto.

Figure 2 is an enlarged partial front elevation of the bracket and cross member taken on a plane indicated by the line 2—2 of Figure 1.

Figure 3 is a side elevation of the bracket and cross member on a plane indicated by the line 3—3 in Figure 2.

Figure 4:
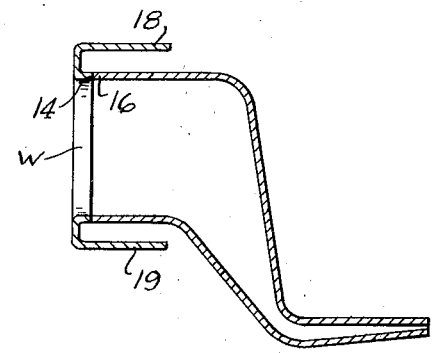
Figure 4 is a cross sectional view of a bracket and vehicle frame side rail member illustrating the method of joining the same.

Referring particularly to Figures 1 to 3 inclusive, the bracket 1 is shown as connected to a cross member 2 of the vehicle frame including channel shaped side rails R. The bracket may be comprised of a piece of metal bent into U-shaped cross section and preferably positioned with the arms of the U disposed downwardly. The body is adapted to be secured to the flat surface of the cross member 2, by butt welding, as will later be described. The body 3 of the bracket member is bent downwardly beginning a short distance from the connection and forms a neck portion 4, as better illustrated in Figure 3, which merges at the extreme outer end into a flanged projection or load bearing lug 6. The lug may be deflected parallel to the main body and is adapted to engage a complementary surface or lug 8 on the engine block or piece to be carried by the bracket.

The cross member may be of box or channel shaped cross section. In the form illustrated a box-like member of sheet metal is employed and the bracket is secured to a vertical flat wall 10 thereof by butt welding the end of the bracket body thereto. In such case of welding it is usually desirable to have a greater thickness of metal to which to weld than the thickness of the wall 10. To provide this material an opening 12 is formed in the flat wall 10 of the cross member and the peripheral margin about the opening is turned at an angle to the remainder of the wall, usually substantially normal to the wall, so as to present the thickness of the stock material to the end of the bracket or member to be butt welded thereto.

The metal so turned forms a lip or hollow boss, the width or height of which, that is, the distance from the welding edge to the opposite side of the wall 10, may be equal to or several times the thickness of the wall 10 of the cross member. The opening may be of any shape desired and preferably of such a shape that when the peripheral margin is thus turned to present the thickness of the wall toward the bracket, the end of the resulting boss or lip is complementary to the bracket or other member to be welded thereto, and its outer surface forms with the outer surface of the bracket a continuous surface. The members are secured together by butt welding the end of the walls of the bracket body to the end of the walls of the boss. This manner of forming the joint is very effective in case any hollow member is to be butt welded to a flat wall of another member, and is not to be applied only to brackets so secured. In all such cases, the opening 12 is usually similar in shape to the end of the member presented for welding, though smaller, so as to provide a boss of the required width complementary to the welding end, as described. By turning such bosses on the flat walls of two members, the flat walls of members may be secured in spaced relation in this manner.

From Figs. 1 to 3 it will be seen that the cross member 2 is of completely closed box section and is preferably formed by butt welding together the edges of the flanges of two channel sections. The flanges at the ends of the cross member are left unattached or divided in horizontal planes. Both ends of the cross member are enlarged laterally as best appreciated from Figs. 1 and 3 and are of channel cross section with the exception of their extreme end edges which are disposed in a single plane to be butt welded to the upper and lower flanges of the side rails R. The flanges of these ends gradually diminish in height as they approach the extreme outer ends of the cross member so that the edges of complementary flanges are disposed in inwardly converging relationship until they meet at the point where the two flanges are butt welded together. It will therefore be seen that the major portions of the two separated arms of the ends of the cross member are of substantially channel shape Moreover, the sides of these laterally enlarged ends diverge outwardly from the cross member to meet the flanges of the side rail so as to present long transverse edges for butt welding along a considerable length to the edges of the rail flanges. The ends of the cross member form struts between the flanges of the side rails to materially strengthen considerable portions of the rails against load and torsion.

In Figure 4 the members have been similarly secured. By way of illustration I have shown a side rail member and bracket, the boss 14 being turned on the side rail member for abutting engagement with the end 16 of the bracket. The width or height of the boss, indicated by W, is greater than the thickness of the metal of the side rail member. The side rail member is provided with the usual inwardly disposed flanges such as 18 and 19. The bracket or other connected member may be so formed as to dispose upper and lower walls thereof face to face with the respective flanges 18 and 19 of the side rail member and additionally secured by spot welding the walls to the respective flanges 18 and 19.

Figure 5:
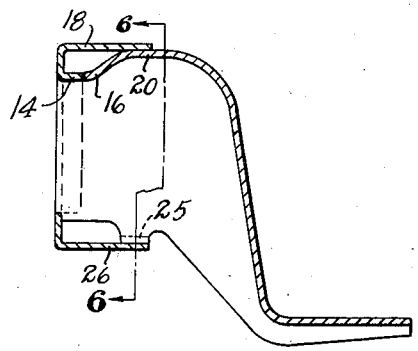
Figure 5 is a cross sectional view of a modified form of bracket illustrating the manner in which it may be secured to a flanged member of the frame.
Figure 6:
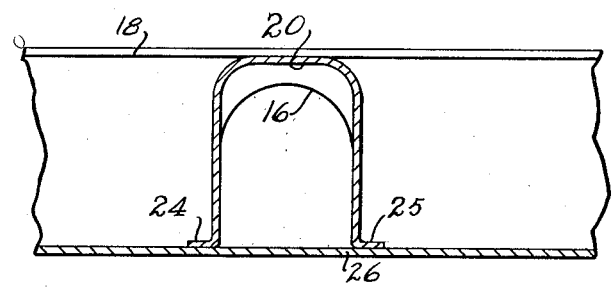
Figure 6 is a view taken on a plane indicated by line 6—6 of Figure 5.

This manner of additionally securing the members is better illustrated in Figures 5 and 6, and is especially useful when the hollow member is open on one side. In such case the hollow member may be secured to the channel member as described, the upper wall 20 being welded to the flange 18. On the open side, fins 24 and 25 may be provided, preferably turned outwardly so as to lie with their faces against the flange 26 of the other member, the fins being spot welded thereto for additional securement.

Figure 7:
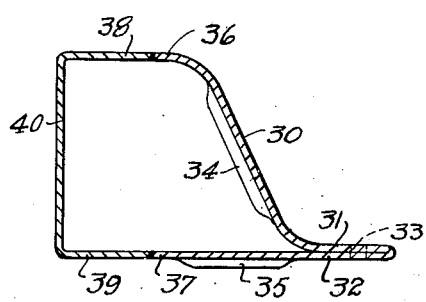
Figure 7 illustrates still another form of bracket.

In Figure 7 is illustrated a simplified form of the bracket which comprises a piece of sheet metal 30 bent intermediate its ends to dispose the portions 31 and 32 adjacent to the bend against or in juxtaposition to each other to form a load bearing lug. The lug may be tapped, as indicated at 33 for securing the load thereto. If desired, flanges may be turned along the sides of the bracket to insure greater rigidity. However, I have found that one or more longitudinal corrugations or depressed areas 34 and 35 are very effective.

The unjuxtaposed end portions 36 and 37 are positioned so as to bring the free ends thereof into the planes of the flanges 38 and 39 respectively of a channeled member 40 to which the bracket is to be secured. The free ends are butt welded to the respective flanges, as illustrated, and form with the channel member a box cross section While I have described my invention particularly in relation to brackets and the manner of securing the same to a vehicle frame, I do not intend to limit the manner of securement or joining only to the bracket, but intend to include securing any flat walled member to the edges of another member by butt welding and otherwise welding in the manner described.

I claim:

1. In a vehicle frame, a sheet metal member having a web and a flange, a hollow sheet metal member presenting an end to said web when the hollow member is positioned with part of its surface in contact with said flange, a portion of the web being turned at an angle to the remainder thereof to present the web thickness in abutting relation to the end of the hollow member when in such position, the end of said hollow member and the turned web portion being butt welded and the surface of the hollow member and flange being welded together.

2. In a vehicle frame, a member having a web and a pair of flanges, and a hollow member having its end extending between the flanges and secured to the web, and the end of the hollow member having a pair of laterally extending fins secured to one flange and a part of the hollow member being secured to the other flange.

ORLIN B. HARMON.